Figure 1:
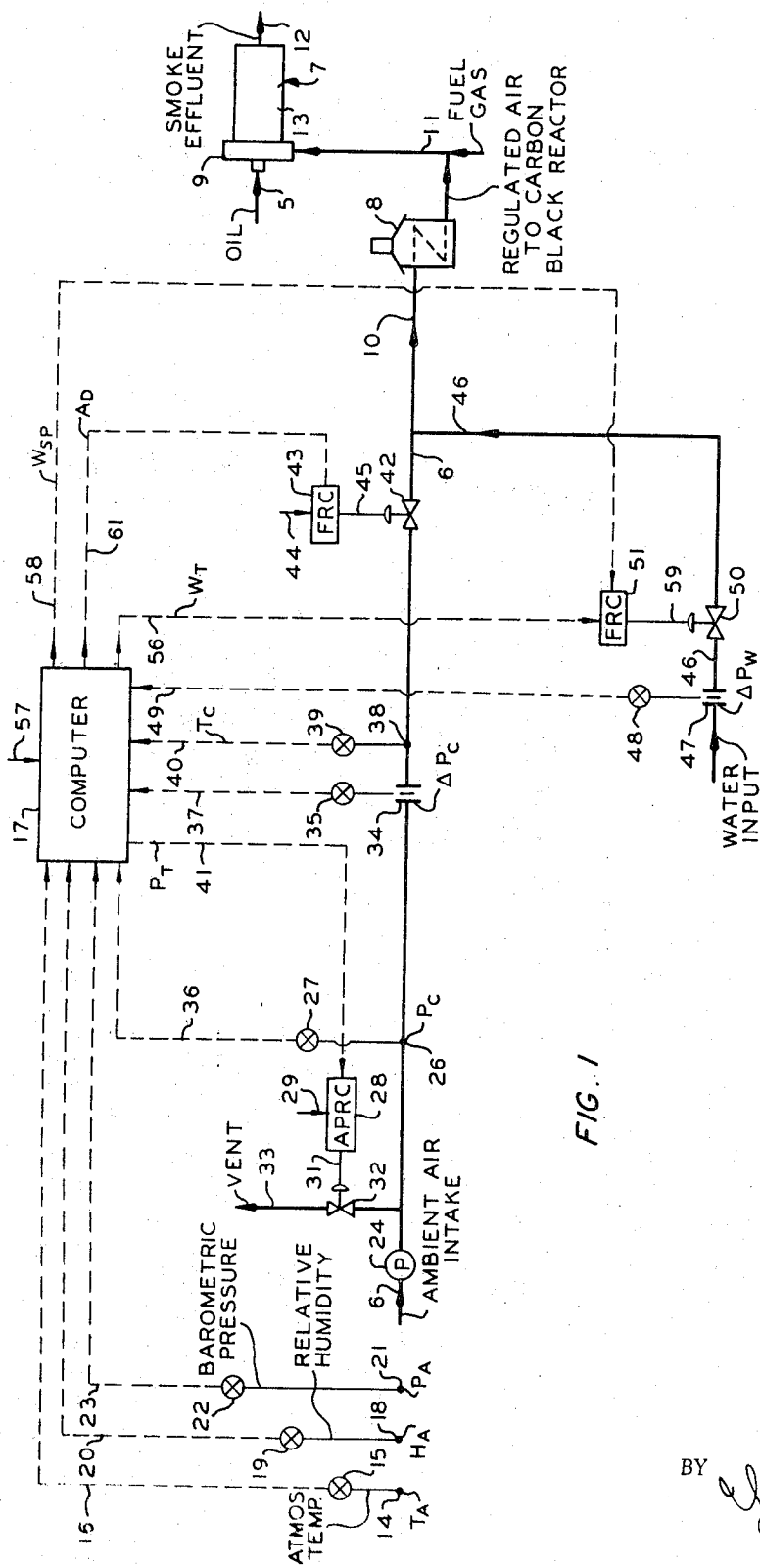

3,350,173
CARBON BLACK PRODUCTION

Theodore W. Colby, Jr., Sweeney, Tex., and Carl M. Kron, Bartlesville, Okla., assignors to Phillips Petroleum Company, a corporation of Delaware
Filed Oct. 2, 1963, Ser. No. 313,293
4 Claims. (Cl. 23—209.4)

This invention relates to a method and apparatus for automatically optimizing the thermal conversion of oil feedstocks to carbon blacks. In another aspect it relates to maintaining the quality of a given carbon black being produced despite changes in barometric pressure and relative humidity of the ambient air used as a process reactant.

Operating experience has demonstrated that important physical properties of oil-derived furnace blacks are sensitive to slight changes in the water content and mass flow rate of the process air. At a commercial, oil-based carbon black plant in Texas, this correlation has been repeatedly demonstrated. For example, at this plant, the passage of a weather cold front through the area was directly responsible for decreases in surface area of a high abrasion furnace black (HAF), such as Philblack[1] O, from 77 to 75 square meters per gram; and also of a concurrently produced intermediate super abrasion furnace black (ISAF), such as Philblack I, from 118 to 113 square meters per gram. Surface area is an important sales specification for carbon black. This variation in quality has a pronounced adverse effect on the salability of the product. Heretofore, available carbon black plant instrumentation has been unable to make any compensation for changes in relative humidity, atmospheric temperature, or barometric pressure, and product quality control has suffered accordingly.

It is, therefore, an object of this invention to improve the operation of an oil-charged carbon black reactor, in terms of carbon black quality.

It is another object to provide a novel quality control system for furnace black manufacture.

It is a still further object to provide method and means for controlling the absolute humidity and mass flow rate of process air to carbon black reactors.

Other objects, aspects, and advantages of the invention will become apparent to those skilled in the art from a study of the disclosure, the drawing and the appended claims to the invention.

According to the present invention, a novel control system is provided for maintaining the quality of carbon blacks produced from oil feedstocks in a thermal cracking furnace. This system is based upon determination of two major features: (1) computation of water content of the ambient air fed to the reactor, and (2) predictive adjustment to a desired water content of the process air by controlled water addition.

These objects are achieved broadly by measuring the temperature, relative humidity, and barometric pressure of the ambient air adjacent the intake point, and also measuring the temperature, pressure, and volumetric flow rate of ambient air flowing in the supply conduit leading to the reactor. These measurements are combined in a computer, employing a novel mathematical model, to produce derived measurement signals representative of the mass flow rates of both water and dry air, respectively, in the ambient air supply conduit.

The dry air mass flow rate signal is employed in a flow control system to provide a desired flow rate. The mass flow rate of water contained in the input air is added to a yet-unspecified measured mass flow rate of additional water, the sum being employed in a total-mass-flow-of-water control system, if desired, receiving its set point value via a ratio control system in accordance with a desired value of pounds of water per pound of dry air.

Also essential to the objects of this invention are means for measuring and maintaining constant the absolute pressure of input air flowing in the supply conduit upstream of the aforementioned measurement of air, temperature, and air flow rate, all these being measurement inputs to the computer.

Finally, means are provided to maintain, at a predetermined level, the volumetric flow rate of air flowing at constant pressure into the carbon black reactor, whereby both the water content and mass flow rate of process air are set at desired values, that, with a given oil feedstock, will produce a carbon black of predictable and desired quality.

Figure 2:
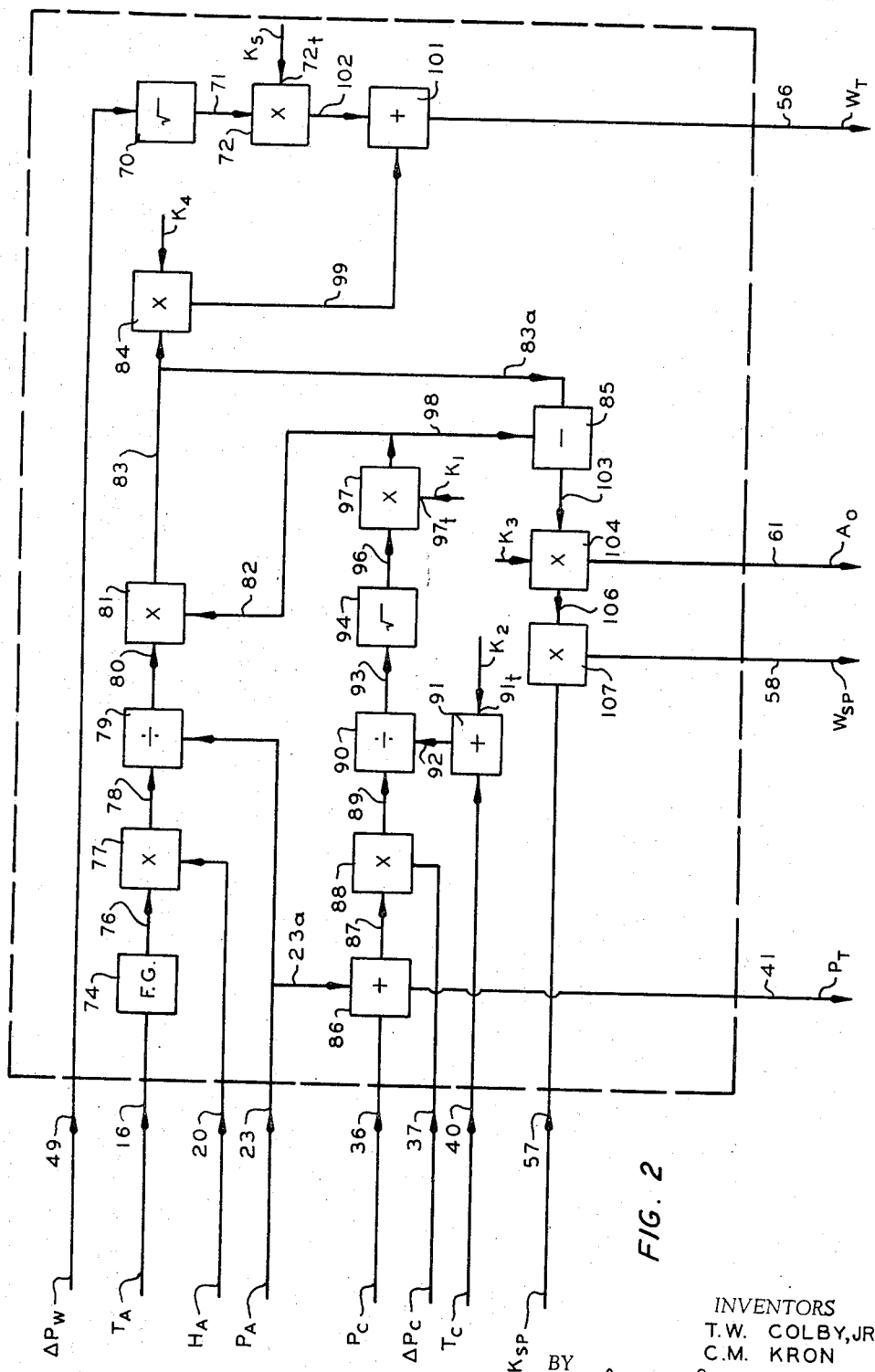

In the drawing, FIGURE 1 is a schematic diagram of an oil-charged carbon black reactor in combination with a novel product quality control system comprising an analog computer, a ratio controller, and suitable measurement and control elements; and FIGURE 2 shows a schematic diagram of elements or components of an analog computing network which can be employed as the computer of FIGURE 1.

Reference is now made to the drawing and FIGURE 1 in particular, wherein there is shown a hydrocarbon charge stock, such as a heavy oil (of the aromatic type), derived from prior art cracking and/or separation processes, which has an API gravity of 0–15 degrees, being axially supplied via conduit 5 to one or several furnaces or reactors, generally designated 7. This charge stock is preferably preheated, for example, in a direct-fired preheater or by exchange with hot effluent gases, to a selected temperature within the range of temperatures such as 450–550° F. Furnace 7 can comprise any carbon black furnace known in the art, such as that disclosed in Ayres Reissue Patent 22,886 of June 3, 1947, that of Krejci, 2,375,745 of May 15, 1945, or that of Krejci, 2,564,700 of August 21, 1951.

Combustible gases, such as mixture of air and natural gas, are preferably conveyed to the expanded section 9 of reactor 7 (or a plurality thereof) via conduit 11, and tangentially introduced therein. In furnace 7, the hydrocarbon charge stock is converted by pyrolytic reaction and/or incomplete combustion into a hot gaseous effluent leaving the furnace by a discharge conduit or smoke header 12 connected to the downstream end of cylindrical section 13. The remaining detailed description will be confined to the novel control system disposed in the ambient air supply conduit 6 and added water supply conduit 46, whereby combustion air and contained water flow rates are regulated to desired values in combined supply conduit 10.

In the vicinity of the intake of air supply conduit 6 of the subject carbon black reactor are disposed: a thermocouple 14 connected to transducer-transmitter 15 and via signal line 16 to computer 17 which senses ambient air temperature ($T_A$); another transducer-transmitter 18–19, which senses relative humidity ($H_A$), such as Foxboro Company's Dewcell, or American Instrument Company's conductivity-type hydrometer, or Minneapolis-Honeywell Regulator Company's Dew Probe, connected via signal lead 20 to computer 17; an absolute pressure transducer 21, which senses barometric pressure ($P_A$) is also connected through transmitter 22 via signal lead 23 to computer 17.

Within the intake conduit 6 is disposed a pumping means 24, such as a centrifugal compressor, to continuously force air into and through the process system. Downstream of compressor 24 is another pressure measurement point 26, at which pressure transducer 27, measures and transmits a signal ($P_C$), representing the gage pressure (p.s.i.g.) of the compressed air to computer 17 via signal line 36.

[1] A trademark.

Air supply conduit 6 has disposed therein a flow measuring assembly and transmitter 34–35, the resulting signal therefrom, designated $\Delta P_C$, being readily correlatable with air flow rate, this transduced signal being transmitted via signal line 37 to computer 17.

The temperature of the compressed air flowing in conduit 6 ($T_C$), is sensed by thermocouple 38 disposed therein, which connects through transducer 39 via signal lead 40 to computer 17.

From computer 17, to be described later, a derived signal, representative of total pressure ($P_T$) in line 6 is transmitted via signal line 41 to an absolute pressure recorder controller (APRC) 28. Motor valve 32, disposed in air bleed-off conduit 33, is operatively responsive to APRC 28. In accordance with the set point 29 and the totalized absolute pressure measurement to controller 28, valve 32 regulates the volumetric flow rate of air thru bleed conduit 33 to maintain relatively constant the absolute pressure of the air supply at point 26 in main conduit 6.

Upstream of preheater 8, disposed in conduit 6, is a motor valve 42 operatively responsive to flow rate controller 43, the latter having an adjustable set point 44 thereon. This controller receives a computer measurement value ($A_D$) via signal line 61 from computer 17.

Water input conduit 46 communicates with air supply conduit 6 which continues as conduit 10. Within added-water supply conduit 46 is disposed a flow measuring element 47 which senses differential pressure ($\Delta P_W$), transmitting a signal representing its magnitude via transducer 48 and line 49 to computer 17.

A motor valve 50 is disposed in conduit 46, intermediate orifice-transmitter assembly 47–48 and its junction with air conduit 6. Motor valve 50 is operatively responsive to a flow rate controller 51, which receives a derived measurement value of totalized water flow via signal line 56, and a set point (desired value) via signal line 58, all to be described later in detail.

An additional computer 17 input signal, line 57, represents the ratio set point (desired value) of pounds of water per pound of dry air to be achieved by the inventive control system.

In operation, computer 17 takes 7 measurement signals from the aforelisted signal lines, 16, 20, 23, 36, 37, 40, 49, and one water-to-air ratio set point signal 57, and produces therefrom three derived measurement signals and one derived set point signal. The first of these derived signals is 56, ($W_T$), representative of the sum of the weights of contained water per unit time (usually pounds per hour) flowing in the ambient air conduit 6, and the water added via conduit 46 to the process.

The second derived signal, ($A_D$), representative of the weight of dry air per unit time (pounds per hour) flowing in conduit 6, passes to dry air mass flow rate controller 43 via signal line 61.

The third derived measurement signal ($P_T$), representative of the absolute pressure at point 26 in conduit 6 is transmitted from computer 17 to absolute pressure recorder controller 28 via signal line 41.

In response to a desired weight ratio of water to dry air (or a desired humidity value) which is elsewhere determined by the specifications of the carbon black product desired from the reactor system, there is manually preset via set point 57 on computer 17, a set point of total pounds per hour water which is transmitted to water flow controller 51 via signal line 58 as the desired value to be achieved by control.

Flow controller 51 compares the two derived input signals, 56 and 58, and obtains a control signal, the magnitude of which is related to the difference between the required total water flow rate and the actual total water flow rate through conduits 10 and 11, preheater 8, and reactor 7. This control signal is transmitted via line 59 to motor valve 50 to adjust the opening thereof, and thusly vary the added water flow rate. If the input signals balance, the valve opening remains unaltered. If signal 58 exceeds signal 56, indicating a low water addition rate, the valve opening is increased until actual and desired flows are in balance. If signal 56 exceeds signal 58, indicating a high water addition rate, the valve opening is decreased until the flows are in balance. In effect, the signal from FRC 51 adjusts the mass flow rate of water being injected into air supply conduit 6 to attain the predetermined water to air mass ratio previously instructed to computer 17 as set point 57.

A derived measurement signal also passes via signal lead 61 to FRC 43. A desired flow rate of air is manually preset via set point 44 on FRC 43, which produces control signal 45 that manipulates motor valve 42 thereby adjusting the volumetric flow rate of air, flowing at constant pressure through conduit 6, in response to signal 61 received from FRC 43, to attain the predetermined air mass flow rate or set point 44.

The calculation of water content of the air being used as process air is made as follows:

Measurements required for the calculation:

(1) Ambient air temperature ($T_A$) near air supply conduit 6 intake is measured by temperature measuring element 14, transmitter 15 and signal line 16 and transmitted to computer 17.

(2) Relative humidity ($H_A$) near the intake is measured by element 18, transmitter 19 and line 20 and transmitted to computer 17.

(3) Barometric pressure ($P_A$) is measured near the air intake by element 21, transmitter 22 and line 23 and transmitted to computer 17.

(4) Differential pressure ($\Delta P_C$) correlatable with ambient air flow across measuring element 34 in conduit 6 is measured by transmitter 35 and line 37 and transmitted to computer 17.

(5) Air pressure ($P_C$) in conduit 6 is measured by element 26, transmitter 27 and line 36 and transmitted to computer 17.

(6) Air temperature ($T_C$) in conduit 6 is measured by element 38, transmitter 39 and line 40 and transmitted to computer 17.

(7) Differential pressure ($\Delta P_W$) correlatible with added-water flow rate by flow element 47 in conduit 46, transmitter 48 and line 49 to computer 17.

Several methods are available for the calculation of the mass flow rate of water entering the reactor's feed system as humidity of the ambient air, the mass flow rate of dry air being determined thereby. From these computer values, flow controllers perform the function of regulating these rates to achieve desired, constant values so that uniformity of yield and physical properties of the carbon black is achieved.

While continuous, plant-worthy, automated methods of analysis of water content of air are known, the presently preferred method for deriving this value is to measure relative humidity, pressure, and temperature of the ambient air, and perform the following computations:

(1) From measured air temperature ($T_A$), the vapor pressure (p.s.i.a.) of water at $T_A$ is derived by a function generator (within the computer), from the known relation of water vapor pressure versus temperature:

Vapor pressure exerted by water (in saturated air) $= f(T_A)$ (2) This value is multiplied by the relative humidity ($H_A$) fraction (percent $H_A \div 100$) to yield the vapor pressure (p.s.i.a.) due to the air's humidity:

VP (water in ambient air) = VP(water in saturated air) × percent R.H./100

(3) This value is divided by the measured barometric pressure $P_A$ (p.s.i.a.) to yield the mol fraction ($M_F$) of water in air:

M.F. water in air = VP (water in ambient air) $\div P_A$ (4) The volume of humid ambient air being fed (conduit 6) to the reactor system, corrected to standard conditions of temperature (32° F.) and pressure (14.7 p.s.i.a.), is computed from the equation:

$$\text{SCFH (humid air)} = K_1 \sqrt{\frac{\Delta P_C(P_C+P_A)}{T_C+K_2}}$$

wherein

SCFH (humid air) is standard cubic feet of air per hour of humid air;
$K_1$=a constant including flow coefficient and miscellaneous flow measurement and correction factors;
$\Delta P_C$=differential pressure (in units compatible with $K_1$);
$P_C$=gage pressure in conduit 6, p.s.i.g.;
$P_A$=barometric pressure, p.s.i.a.;
$T_C$=temperature of air in conduit 6, ° F. and
$K_2$=460° F. (absolute temperature equivalent to 0° F.).

(5) The volume of water vapor contained in the humid air is computed as follows:

SCFH (water vapor)=SCFH (humid air)×M.F. (water in air)

(6) This value is subtracted from the humid air flow rate to give the dry air flow rate:

SCFH (dry air)=SCFH (humid air)−SCFH (water vapor)

(7) This value is converted into mass flow rate, pounds per hour, of dry air by multiplication by density:

$A_D$ (#/hr. dry air)=SCFH (dry air)×$K_3$ where $K_3$=0.0805, density (#/s.c.f.) of air at standard conditions of 32° F., 14.7 p.s.i.a.

From the foregoing discussion, the mathematical formula for the mass flow rate of dry air is derived as:

$$A_D = K_3 \left[ \left( K_1 \sqrt{\frac{\Delta P_C(P_C+P_A)}{T_C+K_2}} \right) - \left( \frac{f(T_A)H_A}{P_A} \cdot K_1 \sqrt{\frac{\Delta P_C(P_C+P_A)}{T_C+K_2}} \right) \right]$$

(8) The water vapor volumetric flow rate is converted into mass flow rate, pounds per hour, of water by multiplication by density:

/hr. (water from air)=SCFH (water vapor)×$K_4$ where $K_4$=0.0501, density #/s.c.f. of water vapor at standard conditions.

(9) The added water mass flow rate is computed as follows:

/hr. (added water)=$K_5\sqrt{\Delta P_W}$ where $K_5$=a constant including flow coefficient and temperature and density correction factors.

$P_W$=differential pressure across flow measuring element 47

(10) Total water added to reactor 7 is the summation of the mass flow rate of water from humid air, (8) above, and through line 46, (9) above:

$W_T$ (#/hr. total water)=#/hr. (water from air)+#/hr. (added water)

(11) The desired mass flow rate of water is computed by multiplication of $A_D$ (7) above, mass flow rate of dry air, by $K_{SP}$, the desired ratio of pounds of water per pound of air set point:

$W_{SP}$ (#/hr. water set point)=$A_D$ (#/hr. dry air)×$K_{SP}$ where $K_{SP}$=desired mass ratio of total water to dry air.

(12) As employed in (3) above, the total (absolute) air pressure existing in conduit 6 at sensing element 26 is computed by addition of barometric pressure, $P_A$, and conduit pressure, $P_C$:

$$P_T = P_A + P_C$$

where $P_T$ and $P_A$ are in pounds per square inch absolute, p.s.i.a., and $P_C$ is gage pressure, p.s.i.g.

The utilization of these analog signals, representative of seven measured variable and one set point variable adjusted as desired, will now be described in more detail in connection with computing network 17 of FIGURE 1. In FIGURE 2, this network is broken down into functional components. It should be understood, therefore, that the individual components of network 17 are not to be considered the invention, but rather the invention resides in the combination of these elements into a novel cooperation which permits the automatic maintenance of the specific humidity of the process air feed despite changing atmospheric conditions.

Referring now to FIGURE 2, measurement signals from lines 49, 16, 20, 23, 36, 37 and 40 from their respective transmitters (not shown), and a manually adjustable set point 57, are transmitted to network 17.

The signal from line 49, representative of the pressure differential across water supply conduit orifice 47, passes directly to a first square root extracting component 70. The resulting signal from component 70 passes via lead 71 to a first multiplying component 72 wherein multiplication by constant $K_5$ is performed, the latter being representative of the orifice coefficient and other factors.

The second input signal from line 16, representative of the temperature of the ambient air, is transmitted to a standard electronic function generator 74, such as an Electronic Associates, Type 16–16B. This function generator is supplied with the correlation of vapor pressure of water versus the ambient air temperature, as is readily drawn from standard tables. Function generator 74 determines the vapor pressure of water at the given temperature, by means of the above mentioned correlation.

The resulting signal passes via lead 76 to a second multiplying component 77, wherein it is multiplied by a third input signal entering component 77 via lead 20. This multiplier signal is representative of the relative humidity of the ambient air. The resulting product signal passes via lead 78 to first dividing component 79.

A fourth input signal 23, representative of the pressure of the ambient air, passes to said first dividing component 79, serving as divisor therein.

The quotient signal from component 79 passes via lead 80 to third multiplying component 81, wherein it is multiplied by a signal entering component 81. This multiplier signal, lead 82, is the volumetric flow rate of humid air, SCFH, previously defined, the derivation of which will be described later. This product signal passes via lead 83 to fourth multiplying component 84 and via lead 83a to first subtracting component 85, both to be described later.

Fourth input signal 23 also passes via lead 23a to a first summing component 86, wherein it is summed with fifth input signal 36, representative of the air pressure in supply conduit 6. The resulting summed signal is passed via line 41 to APRC 28 of FIGURE 1, being representative of the total (absolute) pressure in air supply conduit 6 at measuring point 26.

The same summed signal passes via line 87 to fifth multiplying component 88, wherein it is multiplied by a sixth input signal entering component 88 via lead 37, the latter being representative of the pressure difference across air supply conduit orifice 35. The resulting product signal passes via line 89 to second dividing component 90, serving as dividend therein.

A seventh input signal 40, representative of the temperature of conduit air, enters second adding component 91 via lead 40, wherein $K_2$, a signal representative of the absolute temperature base is added at terminal 91t. This absolute temperature of the conduit air is passed to said second dividing component 90 via lead 92, serving as divisor therein. The quotient signal from component 90 passes via lead 93 to second square root extracting component 94. The resulting signal passes via lead 96 to a sixth multiplying component 97, wherein it is multiplied by the signal $K_1$. This multiplier constant, previously defined, is manually set as an input on the terminal 97$t$ thereof. This product signal representative of the compensated volumetric flow rate of humid air passes via lines 82 and 98 to components 81 and 85, respectively. The product signal resulting from the multiplication in component 81 is passed to fourth multiplying component 84 wherein it is multiplied by constant $K_4$, introduced at lead 84$t$, previously defined, to produce the mass flow rate of water flowing in the humid air stream conduit 6.

The resulting product signal from multiplying component 84 passes via line 99 to a third summing component 101 wherein it is added to the mass flow rate of added water represented by signal 102 from multiplying component 72. The summed signal 56, representative of the total water flow rate ($W_T$), passes from first summing component 101 via line 56 to FRC 51 of FIGURE 1.

Signal 82$a$ is subtracted from signal 98 in first subtracting component 85, the remainder signal, representative of the volumetric compensated flow rate of dry air, passes therefrom via lead 103 to seventh multiplying component 104, wherein it is multiplied by constant $K_3$, previously defined, introduced via lead 104$t$. A product signal representative of the mass flow rate of dry air ($A_D$), passes to FRC 43 of FIGURE 1 via lead 61, and via lead 106 to eighth multiplier 107.

Signal 106 in passing to sixth multiplying component 107 is therein multiplied by eighth input signal 57, representative of the desired mass ratio of total water to dry air rates of flow to the reaction zone. The resulting product signal, representative of the set point for water mass flow rate, is transmitted via line 58 to FRC 51 of FIGURE 1, as an adjustable set point thereon.

In operation, all of the previously described temperature, pressure, humidity and pressure differential measurements are made and transmitted in analog form to the computing network. These signals are representative of the magnitudes of said variables and other preselected data influencing the operations of said reactor.

The conventional measurement and control equipment previously described are available from many automatic controller manufacturers utilizing pneumatic or electrical energy or combinations/of the two as the analog of the measurement and control signals. Likewise, equipment capable of performing the calculations given above is available in either pneumatic or electronic form, as desired, from several manufacturers. In most instances, complex automatic control and optimizing systems will use both pneumatic and electronic instrumentation, computation and control components to the best advantage. Measurement inputs and computing networks must be compatible in their analogies, therefore in some cases transducers from pneumatic to electrical signals, or vice versa, are required to achieve operability and mathematical consistency.

Also, the invention is not limited to the analog form of computing, though in small installations analog equipment is of satisfactory accuracy and of reasonable cost. Where a digital computer or digital differential analyzer is available, on a time-shared basis for example to an operating plant, its use would be economic and is within the contemplation of this invention.

To one skilled in the analog computing art, it is apparent that in some cases several mathematical operations in FIGURE 2 can be combined in one piece of computing equipment, so that the apparent number of computing steps in an actual apparatus will be reduced. Also numerous differing computer configurations may be constructed to carry out the same on substantially the same mathematical operations to achieve the same derived measurements and set point. These are believed to be within the capabilities of one skilled in this art, in possession of this disclosure.

We claim:
1. In a process for the preparation of carbon black in a thermal cracking zone wherein a hydrocarbon feedstock is decomposed in hot combustion gases formed from burning a fuel gas with air, wherein air is supplied to said cracking zone through an air conduit, a method of controlling the water content and mass flow rate of process air to values at which the quality of carbon black produced is maintained at the desired level, responsive to derived control signals calculated by a computer having a fixed program, comprising the steps of:
(a) measuring the temperature, relative humidity, and barometric pressure of the ambient air to an air intake conduit of the thermal cracking zone;
(b) measuring the volumetric flow rate and temperature of the air passing through said air conduit, compensated for temperature and pressure variations, to determine standard volume per unit time;
(c) measuring the pressure of air in said supply conduit;
(d) measuring the mass flow rate of water being injected into said air conduit, at a point in said conduit downstream from where measurments (a), (b), and (c) are made;
(e) determining the desired weight ratio of water to dry air flowing in said air conduit;
(f) computing from the aforementioned measurements the total weight of water per unit time entering said reactor, and obtaining a first derived signal representative thereof, said total weight of water ($W_T$) being computed according to the equation:

$$W_\mathrm{T} = K_5\sqrt{\Delta P_\mathrm{W}} + \left[\frac{f(T_\mathrm{A}) \cdot H_\mathrm{A}}{P_\mathrm{A}} \cdot K_1 \sqrt{\frac{\Delta P_\mathrm{C}(P_\mathrm{C} + P_\mathrm{A})}{T_\mathrm{C} + K_2}}\right] K_4$$

wherein
$T_A$=ambient air temperature
$f(T_A)$=Vapor pressure of water at temperature $T_A$
$H_A$=Relative humidity of the ambient air
$P_A$=Barometric pressure
$\Delta P_W$=Differential pressure across the added water flow conduit orifice
$P_C$=Pressure in the air supply conduit
$\Delta P_C$=Differential pressure across orifice in the air supply conduit
$T_C$=Air temperature in the air supply conduit
$K_1$=Constant including flow coefficient and correction factors for the air supply conduit
$K_2$=Absolute temperature equivalent to 0° F.
$K_4$=Density of water vapor at standard conditions in #/standard cubic foot
$K_5$=Constant including flow coefficient and correction factors for the added water supply conduit;

(g) computing from the aforementioned measurements, the weight per unit time of dry air passing through said air conduit to give a second derived signal representative thereof, said weight per unit time of dry air ($A_D$) being computed according to the formula:

$$A_\mathrm{D} = K_3\left[\left(K_1\sqrt{\frac{\Delta P_\mathrm{C}(P_\mathrm{C} + P_\mathrm{A})}{T_\mathrm{C} + K_2}}\right) - \left(\frac{f(T_\mathrm{A}) \cdot H_\mathrm{A}}{P_\mathrm{A}} \cdot K_1 \sqrt{\frac{\Delta P_\mathrm{C}(P_\mathrm{C} + P_\mathrm{A})}{T_\mathrm{C} + K_2}}\right)\right]$$

wherein:
$K_3$=Density of air at standard conditions in #/standard cubic foot
(h) computing from said aforementioned measurements, the absolute pressure of air passing through said air conduit to give a third derived signal, said absolute pressure ($P_T$) being computed according to the formula:

$$P_T = P_A + P_C$$

(i) computing from a manually preset desired weight ratio of water to dry air, a setpoint of total weight per unit time of water to give a derived setpoint signal representative thereof, said total weight per unit time of water to give said derived setpoint ($W_{SP}$) being computed according to the formula:

$$W_{SP} = K_{SP} \cdot A_D$$

wherein $K_{SP}$ = Desired pounds of water per pound of air;

(j) comparing said first derived signal with said derived setpoint signal, and obtaining a first control signal related to the difference between the required total water flow rate and the actual total water flow rate;

(k) adjusting the mass flow rate of injected water responsive to said first control signal;

(l) comparing said second derived signal with a setpoint representative of a desired mass flow rate of air, and obtaining a second control signal related to the difference between the desired air mass flow rate and the actual air mass flow rate;

(m) adjusting the mass flow rate of air flowing in said conduit responsive to said second control signal;

(n) comparing said third derived signal with a setpoint representative of the desired absolute pressure for air flowing in said supply conduit, and obtaining a third control signal related to the difference between the desired air absolute pressure and the actual air absolute pressure; and (o) maintaining the pressure of air in said air conduit constant responsive to said third control signal.

2. In a carbon black production system, including a reactor, a fuel gas supply conduit for injecting fuel gas into the reactor, an oil supply conduit for injecting conversion oil into the reactor, an air supply conduit for injecting process air from the atmosphere into said reactor, and an effluent smoke conduit means leading from said carbon black reactor, the improvement comprising a quality control system for the carbon black product comprising:

(a) separate means for measuring temperature, relative humidity, and barometric pressure of ambient air at the intake of said air supply conduit;

(b) means for measuring the volumetric flow rate of air entering process through said air supply conduit;

(c) means for measuring the temperature of air entering process through said air supply conduit;

(d) means for measuring the pressure of air in said supply conduit;

(e) a water injection means for injecting water into said air supply conduit, said water injection means being downstream from means (a), (b), (c) and (d);

(f) means for measuring the mass flow rate of water being injected into said air supply conduit through said water injection means;

(g) a computer having a fixed program, said computer receiving the measurements from said means (a), (b), (c), (d), and (e);

(h) first means within said computer for computing from the aforesaid measurements the total weight of water per unit time entering said reactor, and obtaining a first derived signal representative thereof;

(i) second means within said computer for computing from said aforesaid measurements, the weight per unit time of dry air passing through said air supply conduit to give a second derived measurement signal representative thereof;

(j) third means within said computer for computing from a manually preset desired weight ratio of water to dry air and said weight per unit time of dry air passing through said air supply conduit, a set point of total weight per unit time of water to give a derived set point signal representative thereof;

(k) means for comparing said first derived signal of step (h) with said derived set point signal of step (j), and obtaining a first control signal, related to the difference between the required total water flow rate and the actual total water flow rate; and (l) means to control water injected through said water injection means of step (e) in response to the first control signal of step (k) to accomplish said desired weight ratio.

3. In a carbon black production system, including a reactor, a fuel gas supply conduit for injecting fuel gas into the reactor, an oil supply conduit for injecting conversion oil into the reactor, an air supply conduit for injecting process air from the atmosphere into said reactor, and an effluent smoke conduit means leading from said carbon black reactor, the improvement comprising a quality control system for the carbon black product comprising:

(a) separate means for measuring temperature, relative humidity, and barometric pressure of ambient air at the intake of said air supply conduit;

(b) means for measuring the volumetric flow rate of air entering process through said air supply conduit;

(c) means for measuring the temperature of air entering process through said air supply conduit;

(d) means for measuring the pressure of air in said supply conduit;

(e) a water injection means for injecting water into said air supply conduit, said water injection means being downstream from means (a), (b), (c) and (d);

(f) means for measuring the mass flow of water being injected into the air supply conduit through said water injection means of step (e);

(g) a computer having a fixed program, said computer receiving the measurements from said means (a), (b), (c), (d) and (e);

(h) first means within said computer for computing from the aforesaid measurements the total weight of water per unit time entering said reactor, and obtaining a first derived signal representative thereof;

(i) second means within said computer for computing from said aforesaid measurements, the weight per unit time of dry air passing through said air supply conduit to give a second derived measurement signal representative thereof;

(j) third means within said computer for computing from a manually preset desired weight ratio of water to dry air and said weight per unit time of dry air passing through said air supply conduit, a set point of total weight per unit time of water to give a derived set point signal representative thereof;

(k) means for comparing said first derived signal of step (g) with said derived set point signal of step (j), and obtaining a first control signal, related to the difference between the required total water flow rate and the actual total water flow rate;

(l) means adapted to adjust the mass flow rate of water injected through said water injection means of step (e), responsive to said first control signal of step (k);

(m) means for comparing said second derived signal of step (i) with a set point representative of the desired mass flow rate of air, and obtaining a second control signal related to the difference between the desired mass air flow rate and the actual mass air flow rate; and (n) means adapted to adjust the volumetric flow rate of intake air flowing into said reactor responsive to said second control signal of step (m).

4. In a carbon black production system, including a reactor; a fuel gas supply conduit for injecting fuel gas into the reactor; an oil supply conduit for injecting conversion oil into the reactor; an air supply conduit for injecting process air from the atmosphere into said reactor; and an effluent smoke conduit means leading from said carbon black reactor; the improvement comprising a quality control system comprising:

(a) separate means for measuring temperature, relative humidity, and barometric pressure of ambient air at the intake of said air supply conduit;

(b) means for measuring the volumetric flow rate of air entering process through said air supply conduit;

(c) means for measuring the temperature of air entering process through said air supply conduit;

(d) means for measuring the pressure of air in said supply conduit;

(e) a water injection means for injecting water into said air supply conduit, said water injection means being downstream from means (a), (b), (c) and (d);

(f) means for measuring the mass flow rate of water being injected into said air supply conduit through said water injection means of step (e);

(g) a computer having a fixed program, said computer receiving the measurements from said means (a), (b), (c), (d) and (f);

(h) first means within said computer for computing from the aforesaid measurements the total weight of water per unit time entering said reactor, and obtaining a first derived signal representative thereof;

(i) second means within said computer for computing from said aforesaid measurements, the weight per unit time of dry air passing through said air supply conduit to give a second derived measurement signal representative thereof;

(j) third means within said computer for computing from said aforementioned measurements, the absolute pressure of air passing through said air supply conduit to give a third derived measurement signal;

(k) fourth means within said computer for computing from a manually preset desired weight ratio of water to dry air and said weight per unit time of dry air passing through said air supply conduit, a set point of total weight per unit time of water to give a derived set point signal representative thereof;

(l) means for comparing said first derived signal of step (h) with said derived set point signal of (k), and obtaining a first control signal, related to the difference between the required total water flow rate and the actual total water flow rate;

(m) first means adapted to adjust the mass flow rate of water injected through said water injection means of step (e) responsive to said first control signal of (l);

(n) means for comparing said second derived signal of step (i) with a set point signal representative of a desired mass flow rate of air, and obtaining a second control signal related to the difference between said desired mass air flow rate and the actual mass air flow rate;

(o) second means adapted to adjust the volumetric flow rate of intake air flowing into said reactor responsive to said second control signal of step (n);

(p) means for comparing said third derived signal of step (j) with a set point representative of the desired absolute pressure of air flowing to the reaction zone, and obtaining a third control signal, related to the difference between the desired absolute pressure and the actual absolute pressure; and (q) third means adapted to maintain the pressure of air in said supply conduit constant responsive to said third control signal of step (p).

References Cited

UNITED STATES PATENTS 2,564,700  8/1951  Krejci _____ 23—209.4
3,169,046  2/1965  Osburn _____ 23—209.4

OSCAR R. VERTIZ, *Primary Examiner.*

EDWARD J. MEROS, *Examiner.*